(12) United States Patent
Katano

(10) Patent No.: US 8,459,385 B2
(45) Date of Patent: Jun. 11, 2013

(54) FUEL CELL MOUNTING STRUCTURE

(75) Inventor: Koji Katano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/260,094

(22) PCT Filed: Jul. 6, 2010

(86) PCT No.: PCT/JP2010/004407
§ 371 (c)(1),
(2), (4) Date: Sep. 23, 2011

(87) PCT Pub. No.: WO2012/004829
PCT Pub. Date: Jan. 12, 2012

(65) Prior Publication Data
US 2012/0279792 A1    Nov. 8, 2012

(51) Int. Cl.
*B60K 1/00* (2006.01)
(52) U.S. Cl.
USPC ............. 180/65.31; 180/65.22; 180/68.5; 429/469; 429/470; 429/507; 429/508
(58) Field of Classification Search
USPC ............. 180/65.31, 65.22; 429/469, 470, 429/507, 508
See application file for complete search history.

(56) References Cited

U.S. PATENT DOCUMENTS

| | | | |
|---|---|---|---|
| 7,445,076 B2 * | 11/2008 | Shigematsu | 180/299 |
| 7,726,429 B2 * | 6/2010 | Suzuki | 180/232 |
| 8,268,505 B2 * | 9/2012 | Mizusaki et al. | 429/470 |
| 2005/0158606 A1 * | 7/2005 | Xia et al. | 429/34 |
| 2007/0007060 A1 * | 1/2007 | Ono et al. | 180/65.3 |
| 2008/0054538 A1 * | 3/2008 | Igami | 267/140.11 |
| 2008/0073133 A1 * | 3/2008 | Winter et al. | 180/65.3 |
| 2009/0117416 A1 * | 5/2009 | Suh | 429/12 |

FOREIGN PATENT DOCUMENTS

| | | | |
|---|---|---|---|
| EP | 1415847 B1 | * | 9/2006 |
| JP | 2003-072392 A | | 3/2003 |
| JP | 2003-173790 A | | 6/2003 |
| JP | 2005-130545 A | | 5/2005 |
| JP | 2005130544 A | * | 5/2005 |
| JP | 2007-145309 A | | 6/2007 |
| JP | 2009-170169 A | | 7/2009 |
| JP | 2009-295482 A | | 12/2009 |

OTHER PUBLICATIONS

Translation of International Search Report date Oct. 5, 2011 for JP 2010004407.*
International Search Report issued Oct. 5, 2010 in PCT/JP2010/004407.

* cited by examiner

*Primary Examiner* — Katy M Ebner
*Assistant Examiner* — Steve Clemmons
(74) *Attorney, Agent, or Firm* — Kenyon & Kenyon LLP

(57) ABSTRACT

A structure for mounting a fuel cell on an object is provided. This structure is equipped with a fuel cell stack, a motor, and a drive shaft. The fuel cell stack has first and second end plates and at both ends. The motor is driven by the power generated by the fuel cell stack and is fixed to the fuel cell stack. The drive shaft is connected to the output shaft of the motor and extends to both sides of the motor. The fuel cell stack is equipped with a support portion for supporting the drive shaft at the first end plate. The drive shaft is supported by the support portion and the motor.

6 Claims, 4 Drawing Sheets

FUEL CELL MOUNTING STRUCTURE

This is a 371 national phase application of PCT/JP2010/004407 filed Jul. 6, 2010, the contents of which are incorporated herein by reference.

TECHNICAL FIELD

The present invention relates to a fuel cell mounting structure.

BACKGROUND ART

Vehicles mounted with a fuel cell have been proposed in the past. For example, with certain technologies, the fuel cell stack was mounted in the vehicle in a tilted state to place the fuel cell stack following the tilt of the hood. With this prior art, the motor and gear box are installed at the center in the width direction of the vehicle, and the fuel cell stack is placed at the left side in relation to the motor and gear box. By placing the motor and gear box at the center in the width direction of the vehicle, it is possible to make the length of the drive shaft from the motor and gear box to the wheels at left and right even. As a result, it is possible to make the behavior of the vehicle when turning right be generally equal to the behavior of the vehicle when turning left, making it possible to improve the merchantability.

DISCLOSURE OF THE INVENTION

Problem the Invention Attempts to Solve

However, with the aforementioned prior art, it is necessary to place the fuel cell stack in the space between the motor and gear box which are placed generally in the center and the left wheel, so mounting a large fuel cell is difficult. Because of this, mounting a high output fuel cell in a vehicle is difficult. Also, with the aforementioned prior art, the left side of the vehicle becomes heavy because of the fuel cell stack. Specifically, with the aforementioned prior art, it is difficult to make the lateral weight distribution of the vehicle even. This kind of problem is not limited to vehicles, but in fact exists widely for fuel cell mounting structures for which it is desirable to make the overall size small, and for which the weight balance needs to be taken into consideration.

The present invention is addressed to attaining the above objects at least in part, and an object is to make it possible to mount large scale fuel cells and in fact to make it easy to make weight distribution even with a fuel cell mounting structure.

SUMMARY OF INVENTION

The present invention can be realized as one of the following aspects or application examples to address at least part of the above problems.
First Aspect
  A structure for mounting a fuel cell on an object, the structure comprising:
  a fuel cell stack having first and second end plates at both ends,
  a motor driven by power generated by the fuel cell stack and fixed to the fuel cell stack, and
  a drive shaft connected to an output shaft of the motor and extending to both sides of the motor, wherein
  the fuel cell stack comprises on the first end plate a support portion for supporting the drive shaft, and
  the drive shaft is supported by the support portion and the motor.
  With such an aspect, the drive shaft is supported at two points, a support portion provided at the end plate of the fuel cell stack, and the motor. Accordingly, it is possible to arrange the fuel cell stack and motor without being restrained in terms of the distances from the motor to the respective ends of the drive shaft. Thus, it is possible to place the motor at a position close to one end of the drive shaft and distant from the other end, and to place the fuel cell stack at a position close to the other end of the drive shaft and distant from the one end. As a result, with the fuel cell mounting structure, it is possible to mount a large scale fuel cell and also to easily approach having even weight distribution.
Second Aspect
  A structure according to the first aspect, wherein
  the object is a vehicle, wherein
  the fuel cell stack is provided such that
  the first and second end plates are positioned higher than the drive shaft, and
  the first end plate is positioned lower than the second end plate and at the rear of the second end plate along a travelling direction of the vehicle.
  With such an aspect, it is possible to efficiently exhaust liquid within the fuel path provided in the fuel cell stack following along a tilt. Also, with the aforementioned aspect, each end plate is placed so as to be positioned higher than the drive shaft, so when the vehicle is driving, interference between the fuel cell stack and the ground surface does not occur easily. Also, with the aforementioned aspect, the fuel cell stack is placed such that the end plate on which the support portion is provided is at a lower position than the other end plate. Accordingly, compared to an aspect for which the fuel cell stack is placed such that the end plate with the support portion is at a higher position than the other end plate, it is possible to place the end plate with the support portion at a position closer to the drive shaft. Thus, it is possible to make the support portion smaller, and as a result, it is possible to lighten the overall structure.
Third Aspect
  A structure according to the first or second aspect, wherein
  the fuel cell stack and the motor are fixed to the object at the first end plate.
  With such an aspect, by providing a first end plate firmly, it is possible to support the drive shaft with high precision, and at the same time, it is possible to fix the fuel cell stack and motor to the object firmly and with high precision. Also, compared to an aspect for which the fuel cell stack and motor are fixed to the object via a structure other than the first end plate, it is possible to reduce the firmly provided structural elements, and thus possible to lighten the overall structure.
Fourth Aspect
  A structure according to any of the first through third aspects, wherein
  the motor is fixed to the first and second end plates.
  With such an aspect, the end plates of both ends of the fuel cell stack are fixed to the motor. Accordingly, it is possible to reduce the possibility of the fuel cell being deformed due to external force. Thus, it is possible for the fuel cell to perform stable power generation.
Fifth Aspect
  A structure according to the second aspect, the third aspect limiting the second aspect, or the fourth aspect limiting the second or third aspect, further comprising:
  a control circuit for controlling power generated by the fuel cell stack, wherein
  the fuel cell stack comprises a plurality of power generating cells placed in two rows sandwiched by the first and second end plates, and comprises a power generating cell having an electrode with a highest potential during power generation among the plurality of power generating cells, and a power generating cell having an electrode with lowest potential during power generation among the plurality of power generating cells, at ends of the rows on the second end plate side, and the control circuit is placed at a position above the fuel cell stack, and closer to the second end plate than the first end plate.

With such an aspect, it is possible to place an electrode with the greatest difference in potential near the second end plate. Consequently, the control circuit is able to efficiently perform control of the power generated by the fuel cell stack near the second end plate. Also, with the aforementioned aspect, the control circuit is placed at the position near the second end plate which is at a position higher than the first end plate. Accordingly, for example, in a case such as when a vehicle passes through a puddle or river or the like, when the vehicle is sprayed with water from beneath, there is a low possibility of the control circuit becoming wet and being damaged by that water. Because of that, for example even when providing a structure for water proofing the control circuit, compared to an aspect for which the control circuit is placed at a position near the first end plate, it is possible to make the water proofing structure simple. Specifically, it is possible to make the control circuit and the water proofing structure thereof light and small.

Sixth Aspect

A structure according to the second aspect, the third aspect limiting the second aspect, the fourth aspect limiting the second or third aspect, or the fifth aspect, further comprising:

a radiator for cooling a cooling fluid that flows through the fuel cell stack, and a radiator fan motor for rotating a radiator fan for blowing in the radiator, wherein the radiator fan motor is provided at a position overlapping the second end plate when projected in the vehicle travelling direction, and a position further to the front than the second end plate in the vehicle travelling direction.

With such an aspect, when the front structure is damaged due to a collision of the vehicle with an obstacle in the front, there is a high possibility of the radiator fan motor colliding with the second end plate. Meanwhile, the fuel cell stack end plate is generally provided firmly to compress the stacked power generating cells. Consequently, if the kind of aspect noted above is used, compared to an aspect for which the radiator fan motor is at a position at which the radiator fan motor is outside from the second end plate, it is possible to reduce the possibility of damage to another structure of the vehicle when the radiator fan motor collides with the structure. Accordingly, a protective material for protecting that structure does not have to be provided separately to prevent the situation of the radiator fan motor damaging the other structures of the vehicle. Also, even in a case of providing such a protective material, it is possible to make that protective material simple.

Seventh Aspect

A structure according to the second aspect, the third aspect limiting the second aspect, the fourth aspect limiting the second or third aspect, or the fifth aspect, wherein the second end plate is provided at a position for which at least a portion of the second end plate overlaps with a bumper beam with which the vehicle is equipped when projected in the vehicle travelling direction.

With such an aspect, when the vehicle collides with an obstacle in the front and the bumper beam is deformed, the bumper beam has a high possibility of colliding with the second end plate. Consequently, with an aspect such as that noted above, compared to an aspect for which the bumper beam is at a position that is outside from the second end plate, it is possible to reduce the possibility of damage to another structure of the vehicle due to a collision of the bumper beam with the structure. Accordingly, it is not necessary to separately provide a protective material for protecting that structure to prevent the situation of the bumper beam damaging another structure of the vehicle. Alternatively, even when providing such a protective material, it is possible to make that protective material simple.

Eighth Aspect

A structure for mounting a fuel cell in a vehicle, comprising:

a fuel cell stack having first and second end plates, and a plurality of power generating cells placed in two rows sandwiched by the first and second end plates, a reserve tank for holding cooling fluid that flows through the fuel cell stack, and a control circuit for controlling the power generated by the fuel cell stack, wherein the fuel cell stack comprises a power generating cell having an electrode with the highest potential during power generation among the plurality of power generating cells, and a power generating cell having an electrode with the lowest potential during power generating among the plurality of power generating cells, at ends of the rows on the second end plate side, the first end plate is positioned lower than the second end plate, and at the rear of the travelling direction of the vehicle, the control circuit is placed at a position above the fuel cell stack and closer to the second end plate than the first end plate, and the reserve tank is placed at a position above the fuel cell stack and closer to the first end plate than the second end plate.

With such an aspect, it is possible to place the electrode with the greatest difference in potential near the second end plate. Consequently, the control circuit is able to efficiently control the power generated by the fuel cell stack near the second end plate. Also, with an aspect for which the reserve tank is lower than the fuel cell stack, when replenishing the cooling fluid in the reserve tank, there is a possibility of cooling fluid spraying out from the reserve tank due to hydraulic head pressure between the reserve tank and the fuel cell stack. However, with the aspect noted above, the reserve tank is positioned higher than the fuel cell stack, so when replenishing the cooling fluid in the reserve tank, it is possible to reduce the possibility of the cooling fluid spraying from the reserve tank. Also, with the aspect noted above, it is possible to make the thickness of the reserve tank greater than the thickness of the control circuit within a limited space. As a result, it is possible to install a large capacity reserve tank.

Ninth Aspect

A structure for mounting a fuel cell in a vehicle, comprising:

a fuel cell stack having first and second end plates at both ends, a fuel gas pump for supplying fuel gas to the fuel cell stack, a cooling fluid pump for flowing cooling fluid in the fuel cell stack, and an ion exchanger for removing ions in the cooling fluid, wherein the fuel cell stack is placed such that the first end plate is positioned further to the rear of the travelling direction of the vehicle than the second end plate, the fuel gas pump, the cooling fluid pump, and the ion exchanger are placed at the rear of the first end plate, and the ion exchanger is contained within a range for which at least one of the fuel gas pump and the cooling fluid pump exist in relation to the travelling direction of the vehicle.

With such an aspect, when a vehicle collides with an obstacle in front and the front part is damaged, there is a high possibility of the front-back direction of the compressive load being received by at least one of the fuel gas pump and the cooling fluid pump, and the first end plate. Accordingly, it is possible to reduce the possibility of the ion exchanger being damaged due to a collision.

The present invention can be realized in various aspects other than those noted above, and for example, it is possible to realize it in aspects such as a fuel cell mounting method, a fuel cell system, a vehicle in which a fuel cell is mounted and the like.

Hereafter, a detailed description of preferred embodiments of the invention of this application will be presented while referring to the drawings, further clarifying the object described above of the invention of this application as well as other objects, structures, and effects.

Hereafter, aspects for carrying out the present invention will be described based on embodiments.

BEST MODE FOR CARRYING OUT THE INVENTION

A. First Embodiment

Figure 1:
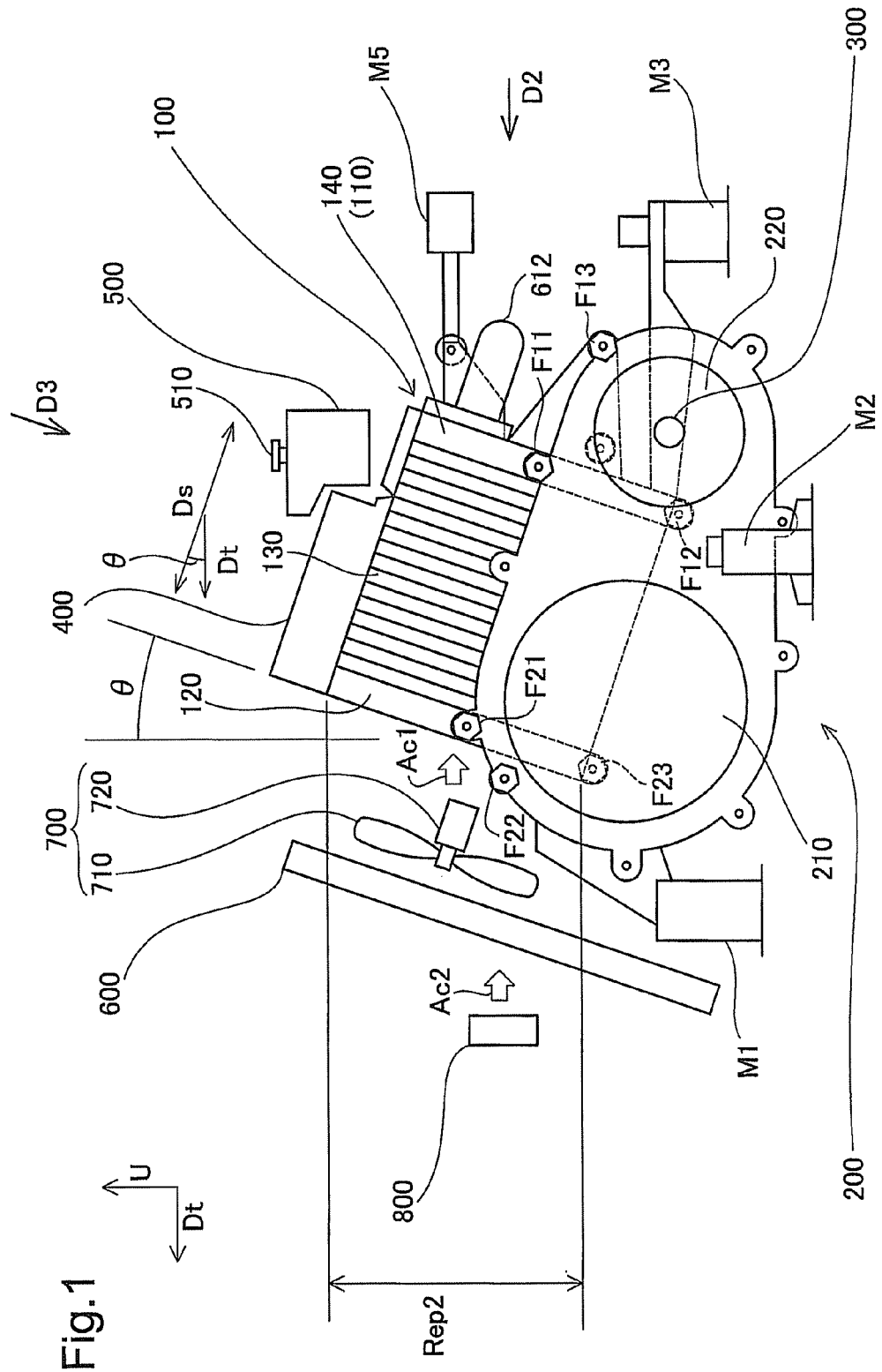
FIG. 1 shows the structure for attaching a drive system equipped with a fuel cell to a vehicle.

FIG. 1 shows the structure for attaching a drive system equipped with a fuel cell to a vehicle. This drive system is equipped with a fuel cell stack 100, a motor unit 200, a drive shaft 300, a control circuit unit 400, a reserve tank 500, a radiator 600, and a radiator fan unit 700. Also, a bumper beam 800 is shown in FIG. 1. This bumper beam 800 is not a structural element of the drive system.

The fuel cell stack 100 is equipped with first and second end plates 110 and 120 placed at both ends, and a plurality of power generating cells 130 placed between those end plates 110 and 120. The end plates 110 and 120 are generally plate shaped members made of stainless steel. However, structures for attaching various members are provided at the outside surfaces of the end plates 110 and 120 (the right side surface of the end plate 110 and the left side surface of the end plate 120).

The plurality of power generating cells 130 are stacked along the linking direction of the first end plate 110 and the second end plate 120. The first end plate 110 and the second end plate 120 are fastened by a fastening member (not shown in FIG. 1). As a result, the plurality of power generating cells 130 are compressed by the first end plate 110 and the second end plate 120. Note that the external shape of the plurality of power generating cells 130 when projected in relation to the stacking direction Ds of the power generating cells 130 is generally the same. Also, the external shape of the first end plate 110 and the second end plate 120 when projected in relation to the stacking direction Ds of the power generating cells 130 is generally the same. With this embodiment, the external shape of the power generating cells 130 and the first end plate 110 and the second end plate 120 when projected in relation to the stacking direction Ds of the power generating cells 130 is roughly rectangular.

The motor unit 200 is fixed using bolts to the first end plate 110 at three location sites F11, F12, and F13. Because of this, the motor unit 200 and the first end plate 110 are not relatively displaced easily even when external force is applied. Specifically, the motor unit 200 and the first end plate 110 are substantially integrally displaced. Also, the motor unit 200 is fixed using bolts to the second end plate 120 at three location sites F21, F22, and F23. Because of this, the motor unit 200 and the second end plate 120 also are not relatively displaced easily even when external force is applied. Specifically, the motor unit 200 and the second end plate 120 also are substantially integrally displaced.

When external force or acceleration are received, in a mode for which the motor unit and the fuel cell stack are displaced independently, to prevent collision or friction of the motor unit and the fuel cell stack, it is necessary to provide a space between the motor unit and the fuel cell stack. However, with this embodiment, the fuel cell stack 100 is fixed to the motor unit 200 via the end plates 110 and 120 at six points. Because of this, the motor unit 200 and the fuel cell stack 100 are substantially integrally displaced. Thus, it is not necessary to provide a space between the motor unit 200 and the fuel cell stack 100, and it is possible to provide a smaller drive system.

Also, the fuel cell stack 100 is fixed to the motor unit 200 via the end plates 110 and 120 at six points, so the stacked structure of the fuel cell stack is not deformed easily even when external force is applied. As a result, the fuel cell stack 100 is able to do stable power generation in a vehicle that is accelerating, and in some cases, when receiving external force.

The motor unit 200 is equipped with a drive motor 210 and a transmission 220 inside the outer shell (see FIG. 1). The drive motor 210 is driven by the power generated by the fuel cell stack 100. The transmission 220 reduces the rotation count per unit of time for rotation output by the drive motor 210. The output shaft of the transmission 220 is connected to the drive shaft 300. Specifically, the drive shaft 300 is rotated by the drive motor 210 via the transmission 220. The drive shaft 300 extends in two directions in relation to the transmission 220, the front side of FIG. 1, and the side facing inward. Note that the drive motor 210 and the transmission 220 are provided integrally inside the outer shell.

The control circuit unit 400 controls the voltage and current of the power generated by the fuel cell stack 100. The control circuit unit 400 is placed along the stacking direction Ds of the plurality of power generating cells 130 on the top part of the fuel cell stack 100 (see FIG. 1). The control circuit unit 400 is placed at a position closer to the second end plate 120 than the first end plate 110. The control circuit unit 400 is fixed to the fuel cell stack 100.

The reserve tank 500 holds cooling fluid that flows through the fuel cell stack 100. The reserve tank 500 is placed on the top part of the fuel cell stack 100 (see FIG. 1). With a mode for which the reserve tank 500 is placed at a position lower than the fuel cell stack 100, when replenishing the cooling fluid via a supply port 510 of the reserve tank 500, due to hydraulic head pressure, there is the possibility of the cooling fluid spraying via the supply port 510. However, with a mode such as this embodiment, even when replenishing cooling fluid via the supply port 510 of the reserve tank 500, the possibility of the cooling fluid spraying via the supply port 510 is low.

The reserve tank 500 is fixed to the fuel cell stack 100. Also, the reserve tank 500 is placed at a position closer to the first end plate 110 than the second end plate 120. Because of this, together with the control circuit unit 400, it is possible to effectively utilize the space on the fuel cell stack 100.

The fuel cell stack 100, the motor unit 200, the drive shaft 300, the control circuit unit 400, and the reserve tank 500 are fixed to the vehicle body via the first end plate 110 of the fuel cell stack 100, the second end plate 120, and the motor unit 200 (see FIG. 1). More specifically, the first end plate 110 is connected to the mounts M3, M4 and M5 provided on the vehicle body. The second end plate 120 is connected to the mount M1 provided on the vehicle body. The motor unit 200 is connected to the mount M2 provided on the vehicle body. Note that the mount M4 does not appear in FIG. 1.

With a mode for which the drive system is attached to the body via a large number of different structural elements, to attach the drive system to the vehicle body firmly and with high precision, it is necessary to provide each of these structural elements so as to have high rigidity. Such a mode becomes heavier overall. However, with this embodiment, the drive system is attached to the body via the three structural elements provided firmly based on the original requirements in terms of function, specifically, the end plates 110 and 120 and the motor unit 200 (particularly the first end plate 110). Thus, it is possible to lighten the overall drive system while attaching the drive system to the vehicle body firmly and with high precision.

The fuel cell stack 100 is placed so as to be at a position higher than the drive shaft 300 when the vehicle is on a horizontal plane in a state the vehicle is not loaded with people and baggage (see FIG. 1). With such a mode, it is possible to reduce the possibility of interference by the fuel cell stack 100 with the ground surface during driving of the vehicle.

Also, in a state when the vehicle is not loaded with people or baggage, and is on a horizontal plane, the fuel cell stack 100, the motor unit 200, the drive shaft 300, the control circuit unit 400, and the reserve tank 500 are fixed on the vehicle body in an attitude with the stacking direction Ds of the plurality of power generating cells 130 tilted by $\theta$ in relation to the horizontal plane (where the angle $\theta$ is $0<\theta<90$) (see FIG. 1). Note that the stacking direction Ds is a direction contained within the plane stretched in the vehicle's front-back direction Dt and vertical direction U. As a result, the first end plate 110 is positioned at a position lower than the second end plate 120 in that state. Also, the first end plate 110 is positioned further to the rear in the vehicle travelling direction than the second end plate 120. Note that in FIG. 1, the vehicle travelling direction is shown by arrow Dt, and the vertical direction is shown by arrow U.

Note that the external shape of the first end plate 110 and the second end plate 120 when projected in relation to the stacking direction Ds of the power generating cell 130 is generally the same. The position of the first end plate 110 and the second end plate 120 is the gravity center position of the range for which the external shape of the first end plate 110 and the second end plate 120 overlap when projected in relation to the stacking direction Ds of the power generating cells 130, and measurement is done with the center position of the thickness direction of the plate shaped part of each end plate as the reference.

With the fuel cell stack 100, a fuel gas flow path, oxidation gas flow path, and cooling fluid flow path equipped with a flow path part that passes through the power generating cells 130 along the stacking direction Ds are provided. As noted above, by placing the fuel cell stack 100 tilted in relation to the horizontal direction (same as Dt in FIG. 1), it is possible to efficiently exhaust the liquid inside those flow paths to outside the fuel cell stack 100. In particular, with a mode for which the fuel cell stack 100 is mounted in a vehicle, there are cases when the vehicle passes along slanted ground, and there are also cases of acceleration and deceleration. Thus, as noted above, by placing the fuel cell stack 100 at a tilt, it is possible to efficiently exhaust the liquid inside the flow path to outside the fuel cell stack 100 under various circumstances.

Note that as the liquid inside the flow path, in addition to the cooling fluid inside the cooling fluid flow path, there is also water existing inside the fuel gas flow path and the oxidation gas flow path. The water that exists inside the fuel gas flow path and the oxidation gas flow path is water added to humidify the fuel gas or oxidation gas, or water generated by power generation.

The control circuit unit 400 and the reserve tank 500 are positioned on the top side of the fuel cell stack 100 when the vehicle is placed in the state noted above (see FIG. 1). Because of this, the kinds of effects below are obtained by placing the fuel cell stack 100 tilted as noted above and by placing the reserve tank 500 at a position at the first end plate 110 side. Specifically, in the space under the vehicle hood (hereafter called the "engine compartment" for convenience), it is possible to make the thickness of the reserve tank 500 greater than the thickness of the control circuit unit 400. As a result, it is possible to effectively utilize the engine compartment and to install a large capacity reserve tank 500.

Also, the control circuit unit 400 is positioned at a position even higher than the reserve tank 500 at the top side of the fuel cell stack 100 when the vehicle is placed in the state noted above (see FIG. 1). Because of this, even when the vehicle enters a water puddle or a river or the like, it is difficult for the control circuit unit 400 to dip into the water, and difficult for water to splash up from the water puddle or river. Also, even when water pours on the control circuit unit 400, the water around the control circuit unit 400 quickly falls to the bottom, and the possibility of it entering inside is low. Because of this, the possibility of the control circuit unit 400 shorting due to water entering from outside the vehicle is low. Because of that, it is possible to make the waterproofing structure of the control circuit unit 400 simple. Specifically, it is possible to make the waterproofing structure of the control circuit unit 400 light and small.

Inside the engine compartment, a radiator 600 is provided in front of the fuel cell stack 100 and the motor unit 200 (see FIG. 1). The radiator 600 is a structure for radiating into the air the heat of the cooling liquid that flows through the inside of the fuel cell stack 100. The radiator 600 is equipped with a cooling fluid flow path that is bent in a complex manner and a large number of heat radiating fins, and overall has a plate shape.

The plate shaped radiator 600 is provided in parallel with the second end plate 120 and the power generating cells 130. Specifically, the plate shaped radiator 600 is placed facing tilted by $\theta$ in relation to the vertical direction U. Because of this, with this embodiment, compared to a mode for which the radiator is placed standing in the vertical direction, the surface area is larger, and as a result it is possible to place a radiator with large external dimensions inside an engine compartment having limited height. Specifically, it is possible to place a radiator with high cooling performance of the cooling fluid per unit of time inside the engine compartment.

Inside the engine compartment, a radiator fan unit 700 is placed between the second end plate 120 of the fuel cell stack 100 and the radiator 600 (see FIG. 1). The radiator fan unit 700 is equipped with a fan 710 for sending air to the radiator 600 and a fan motor 720 for rotating the fan 710. The fan motor 720 is placed at a position overlapping the second end plate 120 of the fuel cell stack 100 when projected in the vehicle travelling direction Dt. Note that the range of the second end plate 120 of the fuel cell stack 100 when projected in the vehicle travelling direction Dt is shown as range Rep2 in FIG. 1.

The fan motor 720 has a hard outer shell. Thus, when the vehicle collides with an obstacle in front and the front part structure is damaged, when the fan motor 720 collides with another weak structural element, there is the risk of damage to that structural element. However, with a mode such as that noted above, when the vehicle collides with an obstacle in front and the front part structure is damaged, the fan motor 720 has a high possibility of colliding with the second end plate 120 (see arrow Ac1 in FIG. 1). Because of this, compared to a mode for which the fan motor 720 is at a position outside of the range of the second end plate 120, there is a lower possibility of the fan motor colliding with the other structural elements of the vehicle and damaging that other structural element. Thus, it is not necessary to separately provide a protective material for protecting that structure to prevent the situation of the fan motor 720 damaging other structural elements of the vehicle.

The bumper beam 800 is provided even further in front of the second end plate 120 of the fuel cell stack 100 and the radiator 600 (see FIG. 1). The bumper beam 800 supports the vehicle bumper (not shown in FIG. 1). The bumper beam 800 is a structure for receiving impact together with the bumper when the vehicle collides with an obstacle in front. Within the engine compartment, when the second end plate 120 of the fuel cell stack 100 is projected in relation to the vehicle travelling direction Dt, the second end plate 120 is provided at a position with at least a portion overlapping with the bumper beam 800 (see range Rep2 in FIG. 1).

With such a mode, when the vehicle collides with an obstacle in front and the bumper beam 800 is deformed, the bumper beam 800 has a high possibility of colliding with the second end plate 120 (see arrow Ac2 and range Rep2 in FIG. 1). Because of this, compared to a mode for which the bumper beam is outside of the range of the end plate, it is possible to reduce the possibility of the bumper beam colliding with other structures of the vehicle (e.g. the control circuit unit 400 or the reserve tank 500) and damaging that structure.

Figure 2:
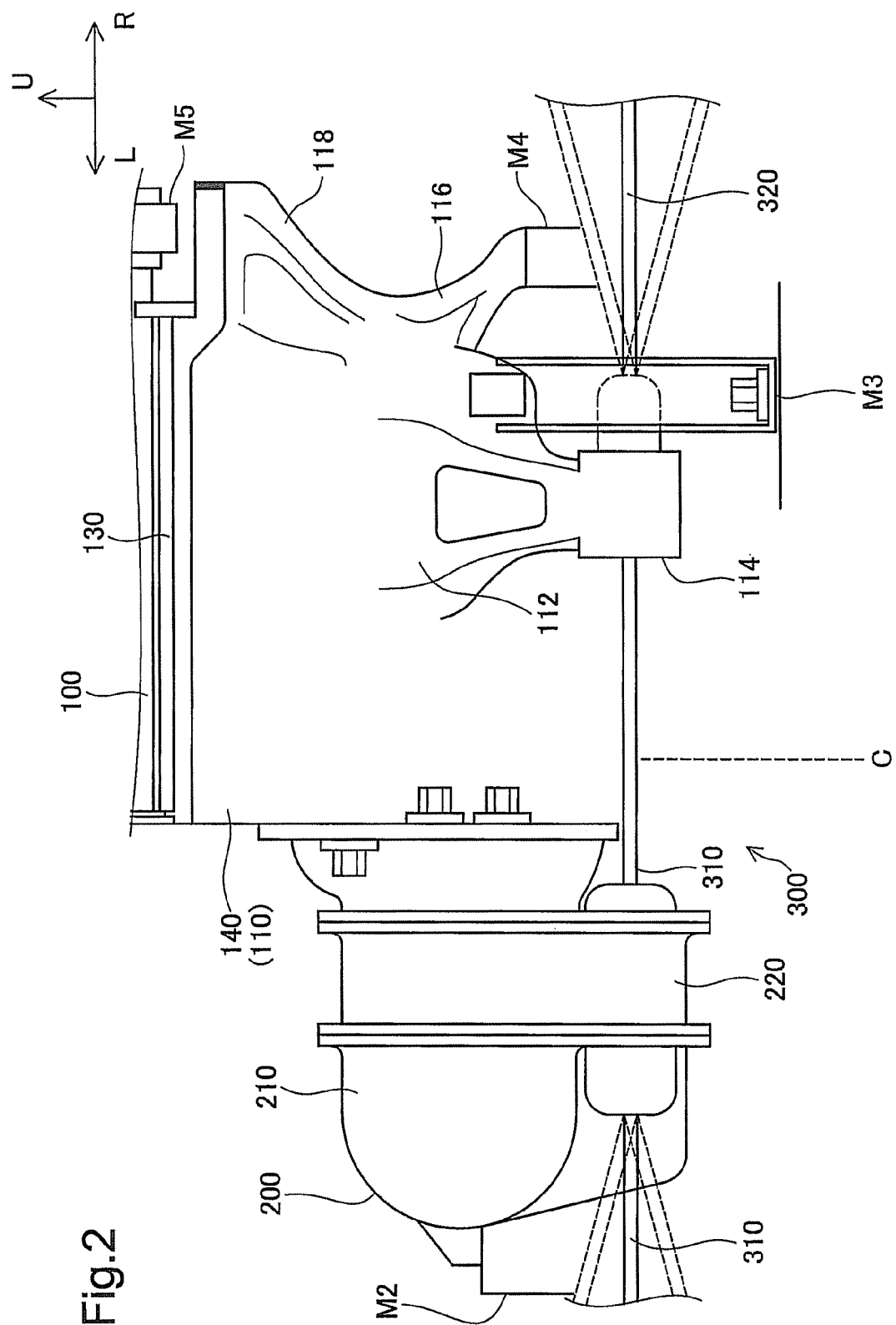
FIG. 2 shows the fuel cell stack 100, the motor unit 200, and the drive shaft 300 when the drive system is viewed from the direction of the arrow D2 of FIG. 1.

FIG. 2 shows the fuel cell stack 100, the motor unit 200, and the drive shaft 300 when the drive system shown in FIG. 1 is viewed from the direction of arrow D2 in FIG. 1. In FIG. 2, to make the technology easy to understand, part of the structure shown in FIG. 1 is omitted. Note that in FIG. 2, the left direction when the vehicle travelling direction Dt is the reference is shown as arrow L, and the right direction is shown by arrow R. Also, the center line of the vehicle lateral direction is shown by C.

As has already been described, the output shaft of the transmission 220 of the motor unit 200 is connected to the drive shaft 300. This drive shaft 300 extends in both lateral directions in relation to the transmission 220 with the vehicle travelling direction Dt as the reference. Specifically, the drive shaft 300 is partially supported on the motor unit 200. Meanwhile, a support portion 112 having a main bearing 114 at the tip is provided on the first end plate 110. The drive shaft 200 is partially supported on the main bearing 114 as well.

Both ends of the drive shaft 300 are connected with the left and right wheels of the vehicle via hub bearings. Note that the hub bearings and wheels are not shown in FIG. 2. A suspension arm is connected to the hub bearing. When the wheel and hub bearing move due to bumps in the road surface or the like, interlinked with this, the suspension arm and part of the drive shaft 300 move. The portions of the drive shaft 300 that moved together with the hub bearing are called the extension shafts 310 and 320.

With this embodiment, the drive shaft 300 is supported at two points by the motor unit 200 and the main bearing 114 (see FIG. 2). Because of this, it is possible to make the distance from the supported sites of the drive shaft 300 to the left-right hub bearings generally equal. Thus, it is possible to make the behavior of the vehicle when the vehicle turns to the left and the behavior when it turns to the right generally equal. As a result, it is possible to increase the merchantability.

Also, with this embodiment, the drive shaft 300 is supported not at one point but rather at two points. Because of this, it is not necessary to place the motor unit 200 at the center of the vehicle to make the distance from the supported sites of the drive shaft 300 to the left-right hub bearings (or wheels) be generally equal. Specifically, it is possible to place the motor unit 200 at a position biased to one wheel side from the center C in the lateral direction of the vehicle. Because of this, it is possible to make the space between the motor unit 200 and the other wheel larger. As a result, it is possible to install a large fuel cell stack 100 in that space. Specifically, it is possible to mount a high output fuel cell stack 100 in the vehicle.

Also, with this embodiment, it is possible to place the fuel cell stack 100 and the motor unit 200 aligned laterally, so compared to a mode for which the motor unit is placed in the center and the fuel cell stack 100 is placed between the motor unit and the wheel, it is possible to have good lateral weight balance of the vehicle.

Furthermore, with this embodiment, the first end plate 110 is positioned at a position lower than the second end plate 120. Because of this, compared to a mode for which the first end plate 110 is at a position higher than the second end plate 120, it is possible to make the support portion 112 for supporting the drive shaft 300 shorter. Thus, it is possible to lighten the first end plate 110, and thus the overall drive system.

Figure 3:
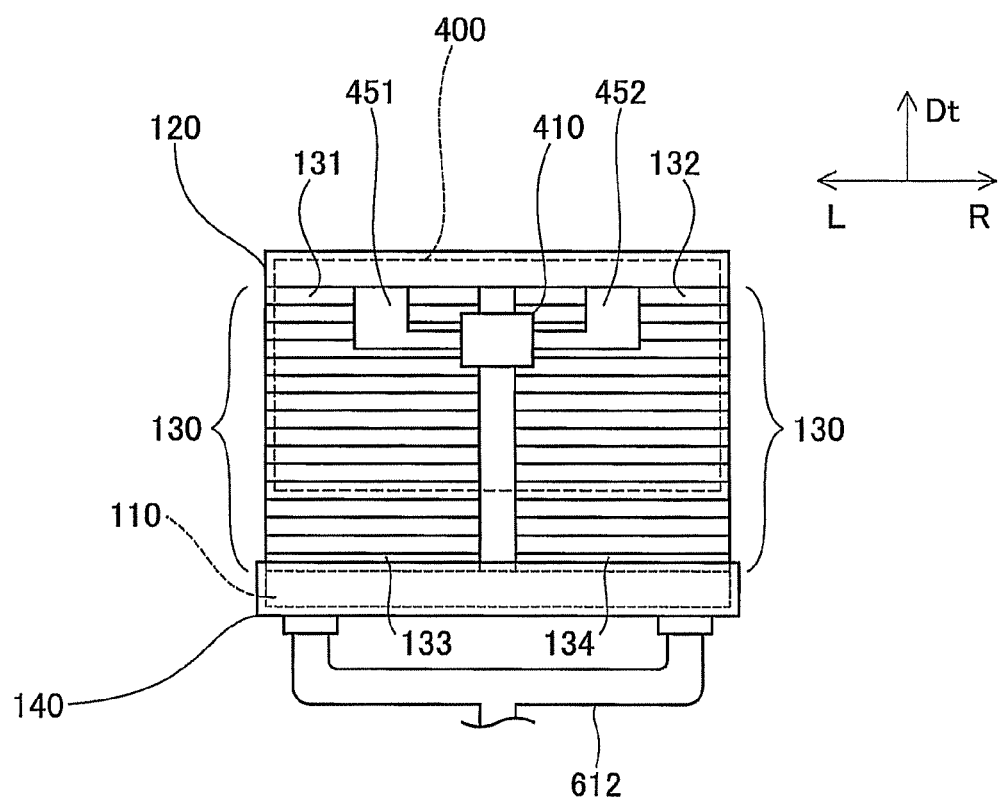
FIG. 3 shows each structure of the fuel cell stack 100, each structure of the control circuit unit 400, and the distribution tube 612 when the drive system is viewed from the direction of the arrow D3 of FIG. 1.

FIG. 3 shows each structure of the fuel cell stack 100, each structure of the control circuit unit 400, and the distribution tube 612 when the drive system shown in FIG. 1 is viewed from the arrow D3 direction of FIG. 1. In FIG. 3, to make the technology easy to understand, part of the structure shown in FIG. 1 is omitted.

With the fuel cell stack 100, the plurality of power generating cells 130 are placed in two rows facing backward (the first end plate 110 side) from the front (second end plate 120 side) of the vehicle travelling direction Dt between the first end plate 110 and the second end plate 120. However, as shown in FIG. 1, the stacking direction Ds of the power generating cells 130 is tilted in the vertical direction. Note that a waterproofing cover 140 is placed on the first end plate 110 (see also FIG. 1).

Among the plurality of power generating cells 130, the power generating cell 131 positioned at the left front end facing the travelling direction Dt is a power generating cell having an electrode with the highest potential during power generation. Among the plurality of power generating cells 130, the power generating cell 132 positioned at the right front end is a power generating cell having an electrode with the lowest potential during power generation. Note that the site with the highest potential during power generation is also called "total plus." The site with the lowest potential during power generation is also called "total minus."

For the left side row power generating cells 130, the potential of each power generating cell becomes lower in sequence facing from the power generating cell 131 positioned at the left front end toward the power generating cell 133 positioned at the left rear end. Also, for the right side row power generating cells 130, the potential of each power generating cell becomes lower in sequence facing from the power generating cell 134 positioned at the right rear end toward the power generating cell 132 positioned at the right front end. Note that the power generating cell 133 cathode and the power generating cell 134 anode potential are equal. Also, during power generation, the potential of the power generating cell 133 cathode and the power generating cell 134 anode becomes the intermediate potential within the fuel cell stack 100.

The control circuit unit 400 for which the outline is shown by a dotted line in FIG. 2 is equipped with a diode 410 for receiving power from the fuel cell stack 100, a switching element connected to the diode, a coil and the like. The total plus is connected to the diode 410 via a busbar 451. The total minus is connected to the diode 410 via a busbar 452. With this embodiment, both the total plus and the total minus are positioned at the second end plate 120 side (see FIG. 2). Also, the control circuit unit 400 is placed at a position closer to the second end plate 120 than the first end plate 110. Because of this, the power supplied from the fuel cell stack 100 is efficiently controlled by the control circuit unit 400 near the second end plate 120 without being significantly consumed midway. Also, it is possible to provide a short busbar 451 connecting the total plus and the diode 410 and busbar 452 connecting the total minus and the diode 410. Because of this, it is possible to have a lighter weight for the busbars 451 and 452.

The distribution tube 612 is tubing for supplying fuel gas to the fuel cell stack 100. The distribution tube 612 supplies fuel gas from the first end plate 110 side to each row for the plurality of power generating cells 130 placed in two rows. Specifically, the distribution tube 612 is firmly structured and positioned at the rear side of the first end plate 110 attached to the body. Because of this, even when the vehicle collides with an obstacle in front and the front part structure is damaged, the possibility of the other strong structure elements bumping into the distribution tube 612 is low. Because of this, even when the vehicle collides with an obstacle in front and the front part structure is damaged, the possibility of flammable fuel gas leaking to the outside is low.

The distribution tube 612 is also connected to structures other than the fuel cell stack 100 (e.g. the hydrogen pump described later). Meanwhile, as described above, with the fuel cell stack 100, the first end plate 110 side connected to the distribution tube 612 has the intermediate potential. Because of this, with this embodiment, the potential difference of the other structures to which the distribution tube 612 is connected and the first end plate 110 is small or zero. Because of this, with this embodiment, it is possible to have a small amount of current flowing to outside from the fuel cell stack 100 through the distribution tube 612 without providing a special device, or it is possible to make it zero. To say this in another way, it is not necessary to design the distribution tube 612 considering the potential difference or the resistance.

Note that here, we described the constitution and effect for only the fuel gas (hydrogen gas) distribution tube 612. However, with this embodiment, the distribution tube for supplying oxidation gas to the two rows of the power generating cells 130 of the fuel cell stack 100, and the distribution tube for supplying cooling water to the two rows power of the generating cells 130 of the fuel cell stack 100 are also attached to the first end plate 110 side. As a result, the same effects are obtained as for the fuel gas distribution tube 612 regarding the potential for damage during collisions and electric potential for those distribution tubes as well.

Figure 4:
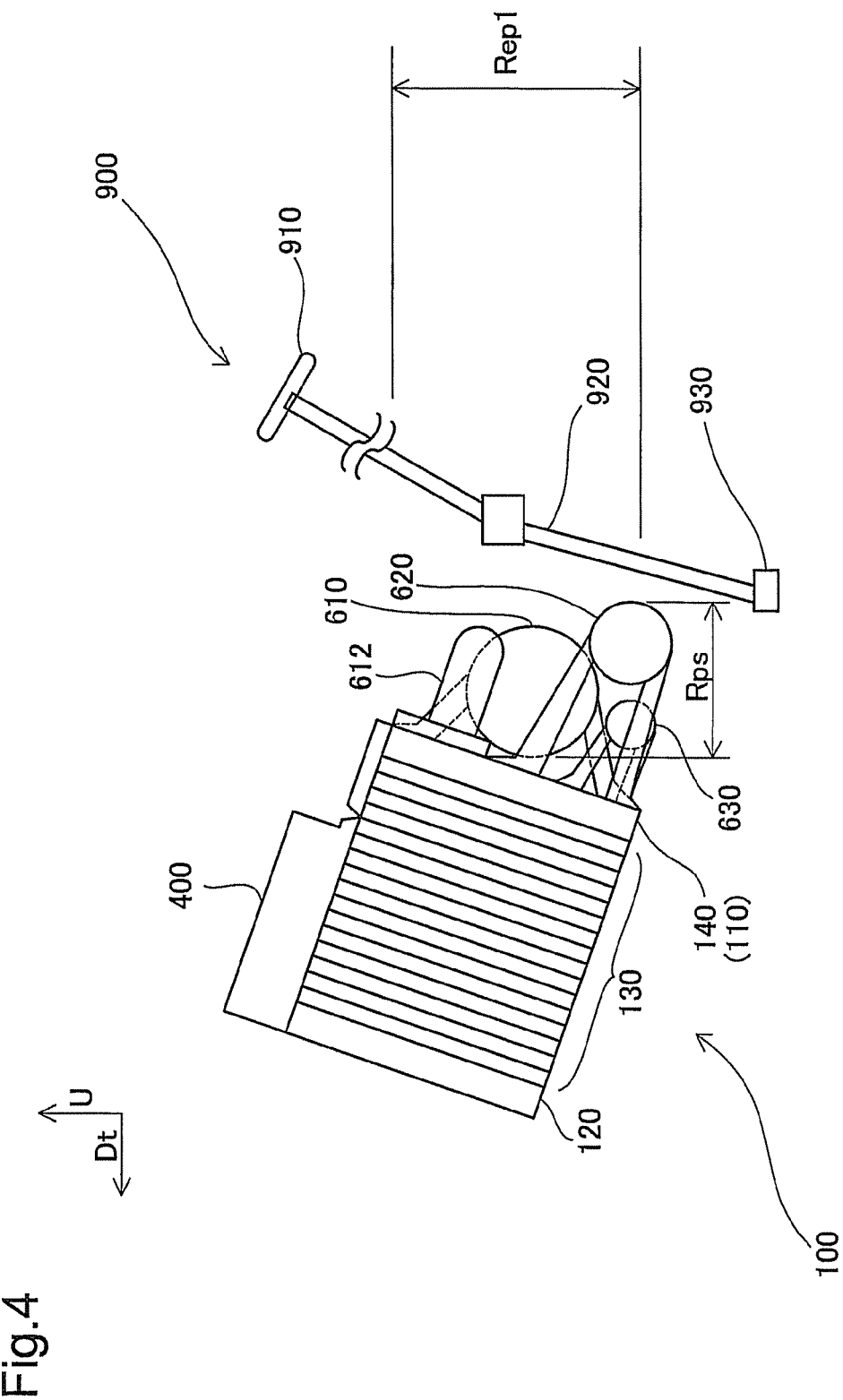
FIG. 4 shows the positional relationship of the fuel cell stack 100, the control circuit unit 400, the steering mechanism 900, the hydrogen pump 610, the cooling fluid pump 620, and the ion exchanger 630.

FIG. 4 is a drawing showing the positional relationship of the fuel cell stack 100, the control circuit unit 400, the steering mechanism 900, the hydrogen pump 610, the cooling fluid pump 620, and the ion exchanger 630. Note that in FIG. 4, to make the technology easy to understand, a portion of the structure of the hydrogen gas flow path, the cooling water flow path and the like are omitted.

With the vehicle, the hydrogen pump 610, the cooling fluid pump 620, and the ion exchanger 630 are provided at the rear of the fuel cell stack 100. The hydrogen pump 610, the cooling fluid pump 620, and the ion exchanger 630 all have a generally round cylindrical outer shape. Each of these is attached to the first end plate 110 of the fuel cell stack 100. The hydrogen pump 610, the cooling fluid pump 620, and the ion exchanger 630 exist within the range in which the first end plate 110 exists in the left-right directions L, R of the vehicle (width direction). The steering mechanism 900 is provided further to the rear of the hydrogen pump 610, the cooling fluid pump 620, and the ion exchanger 630.

The hydrogen pump 610 is a pump for supplying hydrogen gas in the gas exhausted from the fuel cell stack 100 to the fuel cell stack 100 again. The cooling fluid pump 620 is a pump for circulating cooling fluid inside the fuel cell stack 100. The ion exchanger 630 removes ions from the cooling fluid circulating in the fuel cell stack 100. As a result, the cooling fluid insulation value is kept in a fixed range. Note that the ion exchanger must undergo exchange at fixed time intervals.

The hydrogen pump 610 and the cooling fluid pump 620 each have an outer shell that is harder than the outer shell of the ion exchanger 630. Also, the outer shell of the hydrogen pump 610 and the cooling fluid pump 620 both have outer diameters of a cylindrical shape with a bigger diameter than that of the ion exchanger 630. Note that the cooling fluid pump 620 is covered by a case made of resin. The circular diameter of the hydrogen pump 610, the cooling fluid pump 620, and the ion exchanger 630 which all have round cylinder shaped outer diameters are bigger in size in the sequence of the hydrogen pump 610, the cooling fluid 620, and the ion exchanger 630.

The ion exchanger 630 is at the rear of the first end plate 110 when viewed along the vehicle travelling direction Dt, and is placed within the range Rps in which the hydrogen pump 610 and the cooling fluid pump 620 exist. Also, the ion exchanger 630 is placed at a position overlapping by half or more of the projecting area with the first end plate 110 of the fuel cell stack 100 when projected in the vehicle travelling direction Dt. Note that the range of the first end plate 110 of the fuel cell stack 100 when projected in the vehicle travelling direction Dt is shown as range Rep1 in FIG. 4.

Also, the ion exchanger 630 is placed within the range in which the hydrogen pump 610 and the cooling fluid pump 620 exist when viewed along the vehicle left-right direction L, R. Specifically, the ion exchanger 630 is surrounded by the first end plate 110, the hydrogen pump 610, and the cooling fluid pump 620.

The steering mechanism 900 is equipped with a steering wheel 910, a steering shaft 920, and a steering link 930. The steering wheel 910 and the steering link 930 are connected by the steering shaft 920. The steering link 930 is placed in a generally parallel direction to the drive shaft 300 (see FIG. 2), and both ends are connected to a steering knuckle. The steering wheel 910 is rotated by the user, and by the steering link 930 being displaced in the lateral direction in relation to the drive shaft 300 according to that, the direction of the vehicle is changed.

When the vehicle collides with an obstacle in front and the ion exchanger 630 is directly sandwiched by the first end plate 110 and the steering shaft 920, there is the risk of the ion exchanger 630 being damaged by the steering shaft 920. However, with this embodiment, the hydrogen pump 610 and the cooling fluid pump 620 both have an outer shell that is harder than the outer shell of the ion exchanger 630, and each has an outer diameter of a cylindrical shape with a larger diameter than that of the ion exchanger 630. Furthermore, the ion exchanger 630 is at the rear of the first end plate 110 when viewed along the vehicle travelling direction Dt, and is placed within the range Rps in which the hydrogen pump 610 and the cooling fluid 620 exist.

Because of this, even when there is a vehicle collision, close approach of the first end plate 110 and the steering shaft 920 is blocked by the hydrogen pump 610 and the cooling fluid pump 620. Specifically, a space larger than the ion exchanger 630 is secured between the first end plate 110 and the steering shaft 920 when viewed along the vehicle travelling direction Dt. As a result, even when the vehicle collides with an obstacle in the front, the possibility of the ion exchanger 630 being damaged is low.

Note that the vehicle with this embodiment correlates to the "object" in the "SUMMARY OF INVENTION." The motor unit 200 correlates to the "motor" in the "SUMMARY OF INVENTION." The support portion 112 correlates to the "support portion" in the "SUMMARY OF INVENTION." The control circuit unit 400 correlates to the "control circuit" in the "SUMMARY OF INVENTION." The power generating cell 131 correlates to the "power generating cell having the electrode with the highest potential during power generation" in the "SUMMARY OF INVENTION." The power generating cell 132 correlates to the "power generating cell having the electrode with the lowest potential during power generation" in the "SUMMARY OF INVENTION."

B. Variations:

Above, modes of carrying out the present invention have been described, but the present invention is not limited to these of modes of carrying out, and can be implemented in various modes within a scope that does not stray from the key points. The following variations are possible, for example.

B1. Variation 1:

With the aforementioned embodiments, the fuel cell stack 100 has a plurality of power generating cells 130 placed in two rows. However, it is also possible to use a mode for which the fuel cell stack is equipped with a plurality of power generating cells placed in three or more rows. However, it is preferable that the fuel cell stack be equipped with a plurality of power generating cells places so as to constitute an even number of rows. With such a mode, it is possible to place electrodes with the highest potential and electrodes with the lowest potential at the end of the same side of each row.

B2. Variation 2:

With the aforementioned embodiments, the fuel cell stack 100 was fixed to the motor unit 200 at six points F11 to F13 and F21 to F23. However, the mode of fixing the motor and the end plate is not limited to this. For example, the motor and the fuel cell stack can be fixed at one location, two locations, or four or more locations. However, it is preferable to fix the motor and the fuel cell stack at three or more locations. With such a mode, it is possible to fix the motor and the fuel cell stack so that relative displacement does not occur easily in relation to three-axis direction displacement and rotation.

B3. Variation 3:

With the aforementioned embodiments, the motor unit 200 is fixed to the first end plate 100 at three location sites F11, F12, and F13. Also, the motor unit 200 is fixed to the second end plate 120 at three location sites F21, F22, and F23. However, the mode of fixing the motor and the end plates is not limited to this.

For example, the motor and one end plate can be fixed at one, two or more, or four or more locations. However, it is preferable to fix the motor and one end plate at three or more locations. With such a mode, it is possible to fix the motor and the end plate so that relative displacement does not occur easily in relation to three-axis direction displacement and rotation. Note that the fixing method can also be another method other than fastening by a bolt, such as by welding, brazing, adhesion or the like.

B4. Variation 4:

With the aforementioned embodiments, the drive system is attached to the body via three structural elements, specifically the end plates 110 and 120 and the motor unit 200 (particularly the first end plate 110). However, the drive system equipped with a fuel cell can be attached to the body using a different mode. For example, the drive system can be attached to the body via any one or two elements among the two end plates of the fuel cell and the motor. With that kind of mode as well, the drive system is attached to the body via structural elements provided firmly based on the original requirements in terms of function. Because of this, it is possible to lighten the overall drive system while attaching the drive system to the vehicle body firmly and with high precision.

B5. Variation 5:

With the aforementioned embodiments, the fuel cell stack 100, the motor unit 200, the drive shaft 300, the control circuit unit 400, and the reserve tank 500 is fixed to the vehicle body in an attitude for which the stacking direction Ds of the power generating cells 130 is tilted by $\theta$ in relation to a horizontal plane. This $\theta$ is preferably greater than 0 and less than 90 degrees, and more preferably greater than 0 and less than 60 degrees. It is even more preferably greater than 0 and less than 30 degrees.

B6. Variation 6:

With the aforementioned embodiments, with the fuel cell stack 100, the fuel gas flow path, the oxidation gas flow path, and the cooling fluid flow path that pass through the power generating cells 130 have a part provided along the stacking direction Ds. However, it is also possible to have the fuel gas flow path, the oxidation gas flow path, and the cooling fluid flow path inside the fuel cell stack be provided in a different direction. When those flow paths include a flow path part extending along a direction included inside the surface stretched in the power generating cells stacking direction Ds and the vehicle left-right direction L, R, it is possible to efficiently exhaust liquid inside the flow paths by placing the fuel cell stack 100 tilted in relation to the horizontal direction.

B7. Variation 7:

With the aforementioned embodiments, the ion exchanger 630 is placed at a position overlapping by half or more of the projecting area with the first end plate 110 of the fuel cell stack 100 when projected in the vehicle travelling direction Dt. Also, the ion exchanger 630 is placed within the range Rps in which the hydrogen pump 610 and the cooling fluid pump 620 exist when viewed along the vehicle travelling direction Dt. Also, the ion exchanger 630 is placed within the range for which the hydrogen pump 610 and the cooling fluid pump 620 exist when viewed along the vehicle left-right direction L, R. Specifically, the ion exchanger 630 is surrounded by the first end plate 110, the hydrogen pump 610, and the cooling fluid pump 620. However, the ion exchanger can also be placed in a different mode.

However, the ion exchanger 630 preferably has at least a portion placed at a position overlapping the first end plate 110 of the fuel cell stack 100 when projected in the vehicle travelling direction Dt.

Also, the ion exchanger is preferably provided within a range for which at least one of the hydrogen pump and the cooling fluid pump exist, and more preferably provided within a range for which the hydrogen pump exists when viewed along the vehicle travelling direction Dt.

Also, the ion exchanger is preferably provided within the range for which at least one of the hydrogen pump and the cooling fluid pump exist, and more preferably provided within the range for which the hydrogen pump exists when viewed along the vehicle left-right direction L, R.

Also, the ion exchanger is preferably provided between at least one of the hydrogen pump and the cooling fluid pump, and the first end plate, and more preferably provided between the hydrogen pump and the first end plate when viewed along the vehicle travelling direction Dt.

B8. Variation 8:

With the aforementioned embodiments, a structure for which a fuel cell is mounted in a vehicle is described. However, the invention of this application can also be applied to a structure for which a fuel cell is mounted in another object. Specifically, it is possible to apply a mode of at least a part of the present invention to a stationary type motor.

B9. Variation 9:

Above, a detailed description of the invention of this application was given while referring to preferred exemplary embodiments thereof. However, the invention of this application is not limited to the embodiments or structures described above. Also, the invention of this application includes various variations and equivalent structures. Furthermore, the various elements of the disclosed invention are disclosed with various combinations and structures, but these are exemplary items, and there can be more or fewer of each element. It is also possible to have just one element. Those modes are included in the scope of the invention of this application.

The invention claimed is:

1. A structure for mounting a fuel cell on an object, the structure comprising:
  a fuel cell stack having first and second end plates at both ends,
  a motor driven by power generated by the fuel cell stack and fixed to the fuel cell stack, and
  a drive shaft connected to an output shaft of the motor and extending to both sides of the motor, wherein
  the fuel cell stack comprises on the first end plate a support portion for supporting the drive shaft, and
  the drive shaft is supported by the support portion and the motor, and
  wherein the object is a vehicle, wherein the fuel cell stack is provided such that
  the first and second end plates are positioned higher than the drive shaft, and
  the first end plate is positioned lower than the second end plate and at the rear of the second end plate along a travelling direction of the vehicle.

2. A structure according to claim 1, wherein the fuel cell stack and the motor are fixed to the object at the first end plate.

3. A structure according to any of claims 1, wherein the motor is fixed to the first and second end plates.

4. A structure according to claim 1 further comprising:
  a control circuit for controlling power generated by the fuel cell stack, wherein
  the fuel cell stack
    comprises a plurality of power generating cells placed in two rows sandwiched by the first and second end plates, and
    comprises a power generating cell having an electrode with a highest potential during power generation among the plurality of power generating cells, and a power generating cell having an electrode with lowest potential during power generation among the plurality of power generating cells, at ends of the rows on the second end plate side, and
  the control circuit is placed at a position above the fuel cell stack, and closer to the second end pate than the first end plate.

5. A structure according to claim 1, further comprising:
  a radiator for cooling a cooling fluid that flows through the fuel cell stack, and
  a radiator fan motor for rotating a radiator fan for blowing in the radiator, wherein
  the radiator fan motor is provided at a position overlapping the second end plate when projected in the vehicle travelling direction, and a position further to the front than the second end plate in the vehicle travelling direction.

6. A structure according to claim 1, wherein
  the second end plate is provided at a position for which at least a portion of the second end plate overlaps with a bumper beam with which the vehicle is equipped when projected in the vehicle travelling direction.

* * * * *

UNITED STATES PATENT AND TRADEMARK OFFICE
CERTIFICATE OF CORRECTION

PATENT NO. : 8,459,385 B2  
APPLICATION NO. : 13/260094  
DATED : June 11, 2013  
INVENTOR(S) : Katano Page 1 of 1

It is certified that error appears in the above-identified patent and that said Letters Patent is hereby corrected as shown below:

In the Specification:

Column 9, line 65:
Delete "As has already been" and insert therefor --As it has already been--;

In the Claims:

Column 16, claim 4, line 36:
Delete "end pate" and insert therefor --end plate--.

Signed and Sealed this
Tenth Day of September, 2013

Teresa Stanek Rea
*Acting Director of the United States Patent and Trademark Office*